United States Patent [19]

Huang et al.

[11] Patent Number: 5,631,787

[45] Date of Patent: May 20, 1997

[54] POWER REDUCTION SHROUD FOR A HARD DISK DRIVE

[75] Inventors: Benjamin Huang, Palo Alto; Richard G. Ramsdell, Saratoga, both of Calif.

[73] Assignee: Quantum Corporation, Milpitas, Calif.

[21] Appl. No.: 504,357

[22] Filed: Jul. 19, 1995

Related U.S. Application Data

[63] Continuation of Ser. No. 266,729, Jun. 27, 1994, abandoned.

[51] Int. Cl.$^6$ .................................................. G11B 33/14
[52] U.S. Cl. ............................................................ 360/97.02
[58] Field of Search ............................... 360/97.01, 97.02, 360/97.03; 369/261, 258

[56] References Cited

U.S. PATENT DOCUMENTS

| 4,280,155 | 7/1981 | Scott et al. | 360/98 |
|---|---|---|---|
| 4,568,988 | 2/1986 | McGinlay et al. | 360/77 |
| 4,583,213 | 4/1986 | Bracken et al. | 360/97.02 |
| 4,594,626 | 6/1986 | Frangesh | 360/97.02 |
| 4,979,062 | 12/1990 | Stefansky et al. | 360/97.02 |
| 5,208,712 | 5/1993 | Hatch et al. | 360/98.01 |

FOREIGN PATENT DOCUMENTS

| 56-137559 | 10/1981 | Japan | 360/97.03 |
|---|---|---|---|
| 58-108072 | 6/1983 | Japan | 360/97.03 |
| 0196494 | 8/1986 | Japan | 360/97.02 |
| 62-65287 | 3/1987 | Japan | 360/97.02 |
| 2281496 | 11/1990 | Japan | 360/97.02 |
| 2040538 | 8/1980 | United Kingdom | 360/97.02 |

OTHER PUBLICATIONS

IBM Technical Disclosure Bulletin (vol. 23 No. 9 Feb. 1981), p. 4310.

E. Lennemann, "Aerodynamic Aspects of Disk Files", *IBM J. Res. Develop.*, Nov. 1974, pp. 480–488.

*Primary Examiner*—Stuart S. Levy
*Assistant Examiner*—Allen Cao
*Attorney, Agent, or Firm*—David B. Harrison; Raymond R. Moser, Jr.; Debra A. Chun

[57] ABSTRACT

In a disk drive including a conventional head and disk assembly containing a spindle motor for rotating a disk hub at a constant angular velocity and at least one rotating disk mounted to the hub, apparatus comprising a base having a peripheral sidewall surrounding the base. The base supports the head and disk assembly within an interior space defined by the peripheral sidewalls in combination with the base. To reduce the power consumption as well as the operating temperature of the disk drive by controlling and confining the air mass proximate the disk, a shroud is positioned within the interior space and proximate the disk such that the shroud substantially circumscribes the circumference of the disk for an arc of approximately 320 degrees.

13 Claims, 2 Drawing Sheets

FIG.−1

POWER REDUCTION SHROUD FOR A HARD DISK DRIVE

REFERENCE TO RELATED APPLICATION

This is a continuation of application Ser. No. 08/266,729 filed on Jun. 27, 1994, now abandoned.

FIELD OF THE INVENTION

The present invention relates to disk drive data storage systems. More particularly, the present invention relates to a high capacity, Winchester-type disk drive employing a substantially circumferential shroud proximate a disk therein to reduce the electrical power consumed by the disk drive.

BACKGROUND OF THE INVENTION

Over time, Winchester-type fixed disk drives have evolved from large computer peripheral devices having large rotating storage disks and hydraulic head positioning mechanisms into disk drives having very small, fully enclosed packages for inclusion entirely within a housing of small computing systems, such as workstations, personal computers, and portable or laptop computers. Coupled with the miniaturization of disk drives, disk diameters have been reduced from 24 inches to as small as 1.8 inches.

Generally, the external package width and length dimensions of a disk drive define what is known in the art as the "form factor" of the disk drive. While disk drive form factors have progressively decreased, the aerial data storage density of the storage disk has increased dramatically. As such, physically very small disk drives provide the same or greater user data storage capacity than characterized much larger disk drives of only a few years ago.

The reduction of disk drive form factors has permitted direct integration of disk drives into portable or laptop computers. However, a constraint that confronts a developer of such portable computers is the limited amount of power that is available from the power pack, usually a rechargeable battery. Since a disk drive typically consumes a large fraction of the total available power in a portable computer, a disk drive which consumes less power for a given amount of storage capacity is desirable.

Furthermore, environmental concerns about energy conservation have made it desirable to reduce the power consumed by high-capacity disk drives used in desktop computer systems. Since the operation of disk drives significantly contributes to the total power used by a computer, a reduction in disk drive power consumption would in turn reduce the total power used by the computer.

High capacity, contemporary disk drives typically include multiple disks arranged in a commonly journalled stack. A plurality of transducer heads, positioned by a transducer head actuator assembly, are used to access data stored on the surfaces of the disks. Although disk drives containing multiple disks advantageously store significant quantities of data, it has been observed that such disk drives consume more power than disk drives containing a single disk. The higher power consumption is due to increased torque needed to change the momentum of a larger mass of air proximate (between) the multiple disks. The frictional drag between the disk surfaces and the air mass is known as a windage loss. In addition, the power consumption of a disk drive containing multiple disks is particularly increased when the disks are rotated at high speed, e.g. 7200 rpm. Thus, it would be advantageous to confine and control the mass of air proximate the rotating disks in an effort to reduce the power consumption of a disk drive.

One effort to confine and control the air mass proximate the disks in a disk drive having multiple disks is disclosed in U.S. Pat. No. 4,280,155 issued Jul. 21, 1981. Specifically, this patent discloses apparatus for controlling airflow turbulence within a large disk drive, e.g., a disk drive having disks of about eight inches in diameter. The disclosed apparatus is a cover assembly that encloses the entire disk drive assembly. The cover assembly encloses the disk drive assembly in a housing that surrounds about 270° of the disks' circumference. Furthermore, to control airflow turbulence, the disks are spaced from one another by 0.9 inches. In addition, the '155 patent also discloses using vanes, in a fan-like configuration attached to the rotating disk mounting hub of the disk drive and operating in combination with the enclosure, to reduce the temperature within the disk drive by controlling and directing air flow through the drive.

Moreover, the characterization and control of airflow between and near disks in disk drives was investigated and disclosed in E. Lennemann, "Aerodynamic Aspects of Disk Files", IBM J. Res. Develop., November, 1974, pp. 480–488. Therein, airflow phenomena were described as forming particular patterns within the drive depending upon the number of disks and actuator arm position over the disk(s).

Therefore, a need exists in the art for an economical means of reducing the amount of total power consumed during operation of a disk drive, especially, a disk drive containing multiple disks.

SUMMARY OF THE INVENTION WITH OBJECTS

A general object of the present invention is to provide an improved high performance disk drive which overcomes limitations and drawbacks of the prior art.

Another general object of the present invention is to provide a Winchester-type fixed disk drive with a reduced operating current.

A specific object of the present invention is to incorporate a shroud proximate the disk(s) in a disk drive in order to control and confine the air mass proximate the disk(s) and lower overall power consumption of the disk drive.

Specifically, a disk drive, in accordance with a preferred embodiment of the invention includes a head and disk assembly which contains a spindle motor for rotating a disk hub at a constant angular velocity and at least one rotating disk mounted to the hub. The disk extends radially from the hub. Additionally, the head and disk assembly includes a rotary voice coil actuator assembly, located adjacent the rotating disk, for supporting and selectively positioning transducer heads over the surface of the disk. Such selective transducer head positioning enables the heads to access data stored on the disk. The disk drive further includes a base with a peripheral sidewall surrounding the base such that the sidewall defines an interior space. The head and disk assembly is supported by the base and is contained within the interior space. A cover generally fits over the peripheral sidewall to enclose and seal the head and disk assembly within the interior space. To control and confine the air mass proximate the disk, the disk drive contains a shroud that is positioned substantially circumferentially around the disk. Such control and confinement of the air mass near the disk reduces the power consumption of the spindle motor. Additionally, by lowering the power consumption, such a shroud also lowers the operating temperature of the disk drive. Typically, the shroud is a vertical wall extending between the base and cover and is positioned at a distance of approximately 40 mils from an edge of the disk. To facilitate access to the disk by the actuator assembly, the shroud typically does not fully circumscribe the disk, i.e., the shroud contains a gap such that approximately 320 degrees of the disk circumference is encompassed by the shroud.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
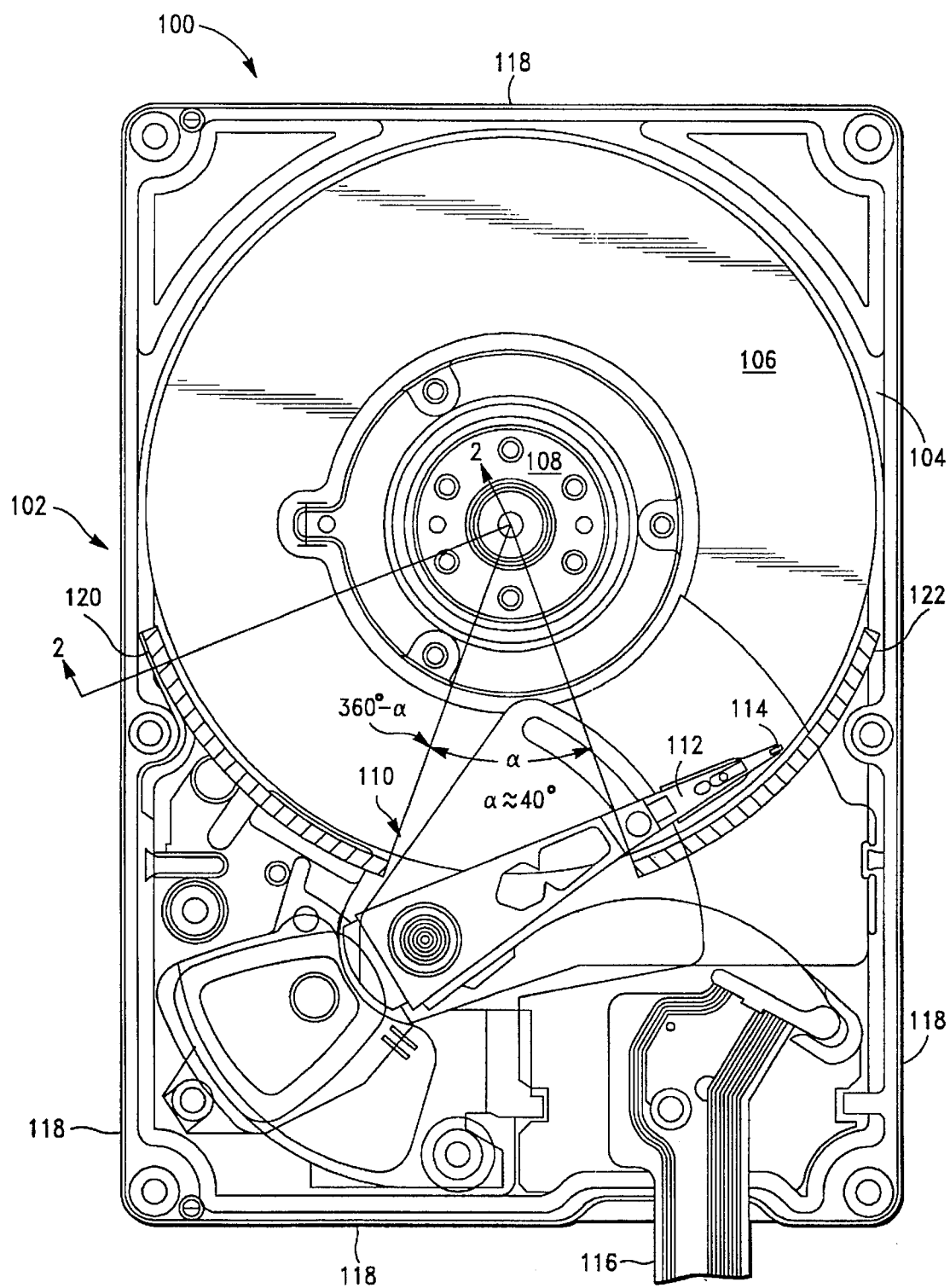
FIG. 1 shows a top plan view of a head and disk assembly, incorporating aspects and principles of the present invention, and highlighting an embodiment of the invention.

To facilitate understanding, identical reference numerals have been used, where possible, to designate identical elements that are common to the figures.

Figure 2:
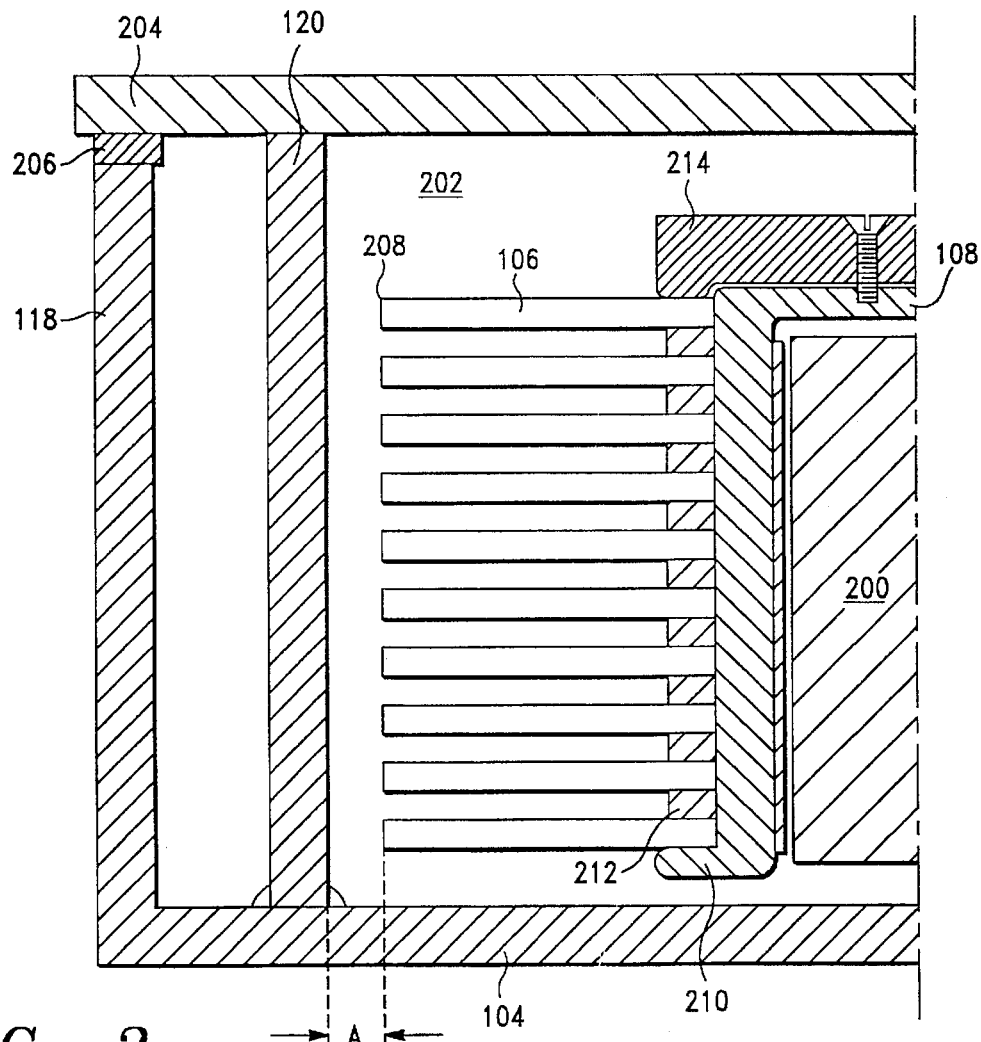
FIG. 2 shows a cross-sectional view of the head and disk assembly, taken along line 2—2 of FIG. 1.

FIG. 1 depicts an enlarged top plan view of a disk drive 100 incorporating one embodiment of the invention. FIG. 2 depicts a cross-sectional view, along line 2—2, of the disk drive 100 shown in FIG. 1. The reader will best understand the invention by simultaneously viewing FIGS. 1 and 2 while reading the following disclosure.

The disk drive contains a head and disk assembly 102 supported by a base 104 preferably formed as a precision injection aluminum casting. The head and disk assembly 102 may contain one or more commonly journalled disks 106, with five or ten disk arrangements preferred. The following discussion describes the preferred embodiment of the invention as being installed in a disk drive having multiple disks, e.g., a full height (1.6") micro-Winchester fixed disk drive having e.g. ten data storage disks of 95 millimeters (3.5") diameter, such as a model Grand Prix manufactured by Quantum Corporation of Milpitas, Calif. However, those skilled in the art will realize that the invention is useful in disk drives having any number of disks.

The head and disk assembly 102 includes a plurality of rotating disks 106 mounted to a spindle hub 108. Specifically, the disks are sequentially stacked upon a disk mounting flange 210 of the hub 108. Spacers 212 are positioned between successively stacked disks 106 such that the lower surface of a higher-mounted disk is separated from the upper surface of a lower-mounted disk by a predetermined distance in order to allow the transducer head assembly to pass over the disk surfaces. A clamping ring 214 is attached to the hub 108 and maintains the disks in parallel relation to one another. The annular spacers 212 space the disks 106 apart by a predetermined dimension, such as 2 mm, surface to surface. In operation, a conventional brushless DC spindle motor 200 rotates the hub 108 and the ten disks 106 clamped onto the hub 108 at a constant high angular velocity, e.g., 7200 rpm.

Each disk 106 is formed of a substrate material such as aluminum or glass which is coated with a magnetic storage medium such as a high Oersted thin film magnetic storage medium. Each of the disks contains a plurality of concentric data tracks formed in the magnetic storage medium. A conventional rotary voice coil actuator assembly 110, located adjacent the disk, supports a transducer head assembly 112 which "flies" over the surface of the disk. Operating in a conventional manner, the actuator assembly 110 selectively positions the transducer head assembly 112 over a specific data track on the disk to enable the transducer heads 114 within the transducer head assembly to access (read or write) the data within the data tracks. Conventional electronics (not shown) are provided for processing the data, for controlling the position of the actuator assembly, and for controlling the spindle motor. These electronics are connected to the head and disk assembly via ribbon cable 116.

More specifically, affixed to the base 104 is a continuous peripheral sidewall 118 which defines an interior space 202 that contains the disk and head assembly 102. A stamped aluminum cover 204 fits over the sidewalls 118 of the base casting 104. Those skilled in the art will appreciate that cover 204 could be manufactured of another suitable material such as steel alloy or composite. The cover 204 is securely attached to the sidewalls 118 by six screws to enclose the head and disk assembly within the interior space. In addition, the disk drive 100 contains a gasket 206, located between the cover 204 and the distal edge of the sidewalls 118, for providing a hermetic seal between the sidewalls 118 and the cover 204, and to provide a fully enclosed and sealed interior space for the head and disk assembly.

In accordance with a preferred embodiment of the invention, a shroud is formed about the circumference of the disks. The non-porous shroud is generally a vertical wall that is located proximate edges 208 of the disks 106 and uniformly spaced therefrom. This shroud has three elements: the sidewalls 118 located proximate the edges of the disks for nearly 180 mechanical degrees of the disk edge and multiple shroud elements 120 and 122 are inserted to, in essence, extend the sidewalls to circumscribe approximately another 90 mechanical degrees of the circumference of the disks 106. Thus, the disks are substantially circumscribed with a shroud (vertical wall) spaced a distance A (e.g. 40 mils) from the edges of the disks, as shown in FIG. 2. A gap designated by the angle α in FIG. 1 (approximately 40 mechanical degrees) in the shroud permits the rotary voice coil actuator assembly 110 to move the transducer heads unimpeded over the disks. By incorporating such shrouding about the disks 106, the mass of air which interacts with the spinning disks is controlled and confined. Consequently, as will become apparent from the experimental data discussed below, the addition of shrouding reduces power consumption and the operating temperature of the disk drive.

The shrouding elements are typically formed of injection molded plastic pieces or strips of plastic such as Lexan™ or by integral molded portions of the base casting. To maintain the shroud elements 120 and 122 in a fixed, arcuate position, one edge of each element 120, 122 is attached to the base 104 with cement, epoxy, or other bonding material, or by screws, or trapped in place by registration with other structure of the base, such as an arcuate groove. In such a position, the shrouds are located a uniform distance A from the disk edge 208. Additionally, to effectively shroud all the disks 106 within the disk stack, the two shrouding elements 120 and 122 extend between the base 104 and the cover 204. While in the present embodiment the shroud-to-disk distance A is approximately 40 mils, it should be understood that the distance can be optimized for each disk drive as a function of the number of disks, spacing between disks and speed of rotation of the disk stack.

Since an object of the present invention is to reduce overall power consumption of the spindle motor 200 and, as a result of reducing the power consumption, reduce the operating temperature of the air and components inside the disk drive 100, various experiments were conducted to verify these effects with regard to the addition of shrouding elements around the disks 106. The details and results of the experiments are detailed below.

Experimental Results

Experiments were conducted to determine whether the addition of shrouding material positioned circumferentially around the outer edge of the disks (as shown in FIGS. 1 and 2) would reduce the overall power consumption of the disk drive and also reduce the operating temperature of the air and components inside the disk drive.

The test was conducted in two phases. A first set of measurements was taken on a disk drive without any shrouding, i.e., control measurements. A second set of measurements was taken from the same disk drive with shrouding elements 120 and 122 added to the disk drive.

The equipment used in the experimentation was a Quantum Grand Prix™ (E2 series, "GPE2") disk drive, powered by a conventional DC power supply and control electronics. An exemplary disk drive architecture is shown in commonly assigned U.S. Pat. No. 5,027,241 to Hatch et al., entitled: Data Head Load Beam for Height Compacted, Low Power Fixed Head and Disk Assembly", the disclosure thereof being incorporated herein by reference. As configured, the test disk drive improved upon the referenced disk drive of the '241 patent and included ten disks, each being approximately 95 mm in diameter, which were spaced apart on the disk stack with a 2 mm spacing between oppositely facing disk surfaces. In order to achieve the 2 mm spacing, 50% sliders were employed. The disks were rotated at a nominal angular velocity of 7200 rpm. Temperatures measured by thermocouples mounted at specific locations within the disk drive sensed temperature of the outside air, the flexible cable 116, inside sidewall 118 of the base 104, inside air, and the top of actuator assembly 110.

The experimental results are shown in the tables below. Table 1 contains the measured temperatures from the disk drive without shrouding, and Table 2 contains the measured temperatures from the same disk drive, with shrouding elements 120 and 122 positioned therein.

TABLE 1

Temperature data from GPE2 disk drive without shrouding.

| THERMO-COUPLE LOCATION | OPERATING DURATION | | | | | | |
|---|---|---|---|---|---|---|---|
| | 0 min | 30 min | 1 hr. | 1.5 hrs | 2 hrs | 2.5 hrs | 3 hrs |
| Outside air | 22 C. | 21 C. | 21 C. | 21 C. | 21 C. | 21 C. | 21 C. |
| Flex cable | 21 C. | 51 C. | 55 C. | 57 C. | 58 C. | 59 C. | 59 C. |
| Sidewall | 21 C. | 47 C. | 51 C. | 53 C. | 54 C. | 54 C. | 54 C. |
| Inside air | 21 C. | 47 C. | 52 C. | 54 C. | 55 C. | 55 C. | 55 C. |
| Actuator assembly | 21 C. | 49 C. | 53 C. | 55 C. | 57 C. | 57 C. | 57 C. |

TABLE 2

Temperature data from GPE2 disk drive with shrouding.

| THERMO-COUPLE LOCATION | OPERATING DURATION | | | | | | |
|---|---|---|---|---|---|---|---|
| | 0 min | 30 min | 1 hr. | 1.5 hrs | 2 hrs | 2.5 hrs | 3 hrs |
| Outside air | 22 C. | 22 C. | 22 C. | 22 C. | 22 C. | 22 C. | 22 C. |
| Flex cable | 22 C. | 47 C. | 52 C. | 55 C. | 56 C. | 56 C. | 56 C. |
| Sidewall | 22 C. | 43 C. | 48 C. | 50 C. | 51 C. | 51 C. | 51 C. |
| Inside air | 22 C. | 44 C. | 48 C. | 51 C. | 52 C. | 52 C. | 52 C. |
| Actuator assembly | 22 C. | 45 C. | 50 C. | 53 C. | 54 C. | 54 C. | 54 C. |

Note that the operating temperatures stabilize after two hours of continuous disk drive operation. Moreover, and quite significant to the present invention, the addition of shrouding elements 120 and 122 proximate the disks reduces the operating temperature of the disk drive by 3 degrees C.

Figure 3:
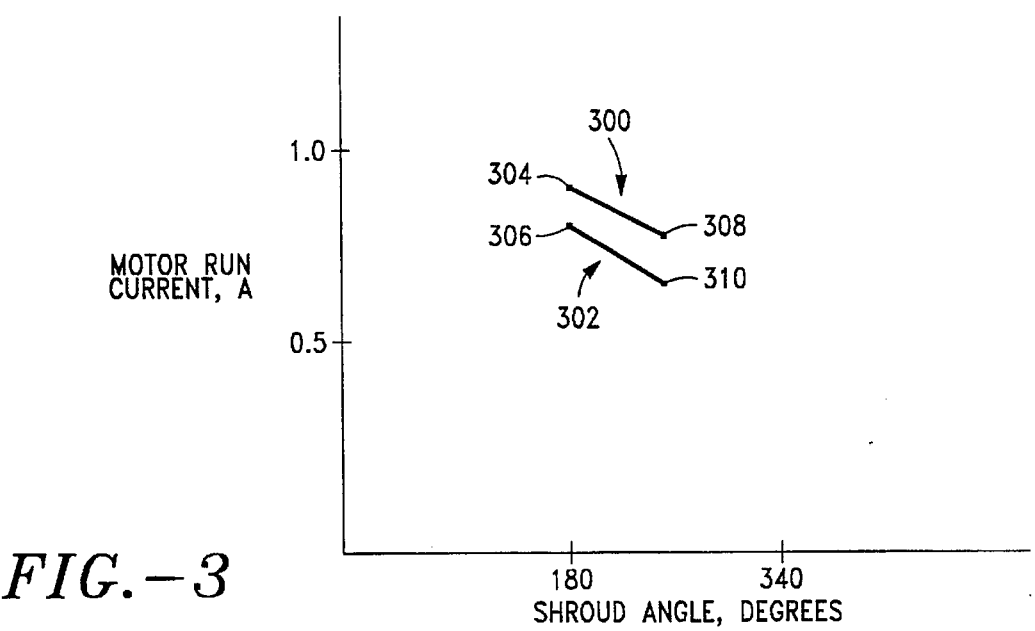
FIG. 3 is a graph showing motor run current vs. shroud angle.

In addition to measuring the operating temperature of the disk drive, experiments were also conducted to measure changes in operating current to the spindle motor (motor run current) in response to changes in the amount of shrouding placed around the disks in the Grand Prix™ disk drive. The additional shrouding is measured in mechanical degrees about the disks. The experimental results for motor run current versus mechanical degrees of shrouding are shown in FIG. 3.

The line labeled 300 shows changes in the motor run current as shrouding is added while the actuator arm is positioned at the inner diameter of the disk; line 302 shows changes in the motor run current as shrouding is added while the actuator arm is positioned at the outer diameter of the disk. In each case, points 304 and 306 indicate the motor run current of the disk drive without additional shrouding, e.g., with 180 degrees of shrouding produced by the sidewalls of the disk drive. As additional shrouding is added to further circumscribe the disks, the additional shrouding reduces the motor run current. The disks were circumscribed by additional shrouding elements until the motion of the actuator assembly was impeded by the shrouding, e.g., approximately 270 degrees of shrouding. The motor run current with 270 degrees of shrouding is indicated as points 308 and 310. As is clear from this experimental data, the addition of the shrouding elements reduces the motor run current as well as the operating temperature of the disk drive.

The foregoing disclosure discussed adding two shroud elements 120 and 122 to a disk drive that presently had sidewalls that partially shrouded the disks. However, those skilled in the art will realize that if the sidewalls of a disk drive are not presently proximate the disks, a single shrouding element can be provided that substantially surrounds the disks for approximately 270 degrees. In this manner, a single shroud, uniformly distanced from the disk edges, can be fashioned to substantially circumscribe the disks with, of course, an opening in the shroud to enable the actuator assembly to position the transducer head assembly over the disks. Such a shroud could be produced as an elongated, rectangular strip of plastic having a width that provides shrouding for at least one of the disks and a length that substantially circumscribes the circumference of the disks. One edge of the shroud (a long edge) would be attached to the base of the disk drive.

In a further embodiment of the invention, the two shroud elements, rather than be additional elements that are cemented to the base, can be fashioned during casting of the base and sidewalls as extensions of the sidewalls. Thus, the shroud elements would be formed of cast aluminum as an integral portion of the disk drive base. Additionally, the sidewalls that are proximate the disks could be cast to be a uniform distance from the disks. In this manner, the sidewalls and the extensions would, in combination, form a shroud that is a uniform distance from the disks.

By enclosing the rotating disk stack with a confining shroud, positioned at an optimized radial distance from the spinning disks, a reduction in the amount of power required to spin the disks at a high rotational velocity is obtained. A further beneficial result is a corresponding reduction in temperature rise within the disk drive enclosure.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A power reducing apparatus in a disk drive including a head and disk assembly containing a spindle motor for rotating a spindle hub at a constant angular velocity and a plurality of rotating data storage disks fixedly mounted to said spindle hub and extending radially therefrom, and a rotary voice coil actuator for positioning a stack of data transducer heads at respective data track locations defined on major surfaces of the rotating data storage disks, the power reducing apparatus comprising:

a base supporting said head and disk assembly and including a peripheral sidewall surrounding the base, the peripheral sidewall defining an interior space containing said head and disk assembly;

a cover mounted to the base for enclosing and hermetically sealing said interior space; and a non-porous shroud means comprising a vertical wall of and within the interior space, the shroud means being spaced from an outer circumference of said disks by a predetermined distance, the shroud means extending continuously for at least approximately 320 mechanical degrees around the data storage disks and defining a gap therein for enabling said rotary voice coil actuator to project through said gap for positioning said stack of said data transducer heads, the shroud means fixedly attached to the base and extending from a floor wall of the base to the cover, the shroud means contacts the base and the cover to confine an air mass interacting with the rotating data storage disks and to reduce power consumption of the spindle motor.

2. The apparatus of claim 1 wherein the predetermined distance that said shroud means is spaced from the outer circumference of said disks is approximately 40 mils.

3. The apparatus of claim 1 wherein said shroud means comprises a portion of said peripheral sidewall of said base that is proximate said edge of said disk in combination with at least one shroud segment proximate said outer circumference of said disks at a location where said peripheral sidewall is not proximate to said outer circumference of said disks.

4. The apparatus of claim 1 wherein said plurality of disks comprises at least five data storage disks and wherein each disk has a diameter of approximately 3.5 inches, and wherein the predetermined distance that said shroud means is spaced from the outer circumference of said disks is approximately 40 mils.

5. The apparatus of claim 1 wherein said a height of said head and disk assembly is approximately 1.6 inches, wherein said plurality of disks comprises ten data storage disks having diameters of approximately 95 millimeters, having oppositely facing data storage surfaces spaced apart by approximately two millimeters, and wherein the predetermined distance that said shroud means is spaced from the outer circumference of said disks is approximately 40 mils.

6. The apparatus of claim 1 further comprising at least five disks having a diameter of approximately 3.5 inches, and wherein said shroud is a substantially vertical wall positioned orthogonal to said base and substantially orthogonal to parallel radial planes of the disks, said shroud substantially circumscribing said disks at a predefined distance from the outer circumference of said disks.

7. The apparatus of claim 6 wherein said predefined distance between said shroud and said disks is approximately 40 mils.

8. A disk drive comprising:

a base including a peripheral sidewall surrounding the base, the peripheral sidewall defining an interior space;

a head and disk assembly, supported by said base within said interior space, containing a spindle motor for rotating a spindle hub at a constant angular velocity, a plurality of identically dimensioned rotating data storage disks fixedly mounted to said spindle hub and extending radially therefrom, and a rotary voice coil actuator assembly operatively positioned adjacent said rotating disks, for selectively positioning a stack of transducer heads over data storage surfaces of the disks to access data on concentric data storage tracks thereof;

a cover, attached to said peripheral sidewall, for enclosing and hermetically sealing said head and disk assembly in said interior space; and a non-porous shroud comprising a vertical wall of and within the interior space, the shroud attached to said base and extending from said base to said cover such that the shroud contacts the base and the cover to confine an air mass interacting with the rotating data storage disks and to reduce power consumption of the spindle motor, said shroud substantially circumscribing said disks for at least approximately 320 mechanical degrees at a predefined distance from an edge of said disks, and for defining a gap through which said rotary voice coil actuator assembly is disposed.

9. The disk drive of claim 8 wherein said non-porous shroud comprises a portion of said peripheral sidewall of said base that is proximate said edge of said disk in combination with a shroud element proximate said edge of said disk at a location where said peripheral sidewall is not proximate said edge of said disks.

10. The disk drive of claim 9 wherein said disk drive is a 1.6 inch full-height 3.5 inch hard disk drive, wherein said plurality of data storage disks comprises ten data storage disks each having a diameter of approximately 3.5 inches, having oppositely facing data storage surfaces spaced apart by approximately two millimeters, and wherein the predetermined distance is approximately 40 mils from the edge of said disk.

11. The disk drive of claim 8 wherein said non-porous shroud is a substantially vertical wall positioned orthogonal to said base and substantially orthogonal to a radial plane of the disks.

12. A 1.6 inch full-height, 95 millimeters diameter hard disk drive comprising:

a base including a peripheral sidewall surrounding the base, the peripheral sidewall defining an interior space;

a head and disk assembly, supported by said base within said interior space, containing:
  a spindle motor for rotating a spindle hub at a constant angular velocity,
  at least ten identically dimensioned rotating data storage disks having diameters of approximately 95 millimeters, being fixedly mounted as a disk stack upon said spindle hub, and having oppositely facing data storage surfaces spaced apart by approximately two millimeters, and
  a rotary voice coil actuator assembly operatively positioned adjacent said rotating disks, for selectively positioning a stack of data transducer heads over data storage surfaces of the disks to access data on selected concentric data storage tracks thereof;
a cover, attached to said peripheral sidewall, for enclosing and hermetically sealing said head and disk assembly in said interior space; and
  the head and disk assembly including a non-porous shroud wall structure extending from said base to said cover at an approximate distance of 40 mils from edges of said disks and circumscribing said disks for at least approximately 270 mechanical degrees, the non-porous shroud wall comprising a vertical wall of and within the interior space, the shroud contacts the base and the cover for confining an air mass interacting with the rotating data storage disks to reduce power consumption of the spindle motor, and the shroud wall structure for defining a gap through which a portion of said rotary voice coil actuator assembly including said stack of data transducer heads is disposed.

13. The 1.6 inch full-height, 95 millimeters diameter hard disk drive set forth in claim 12 wherein the shroud wall structure extends for approximately 320 mechanical degrees around the data storage disks.

* * * * *